(12) United States Patent
Luo et al.

(10) Patent No.: US 8,530,372 B2
(45) Date of Patent: Sep. 10, 2013

(54) OXYGEN STORAGE CATALYST WITH DECREASED CERIA REDUCTION TEMPERATURE

(75) Inventors: Tian Luo, Piscataway, NJ (US); Michel Deeba, East Brunswick, NJ (US)

(73) Assignee: BASF Corporation, Florham Park, NJ (US)

( * ) Notice: Subject to any disclaimer, the term of this patent is extended or adjusted under 35 U.S.C. 154(b) by 133 days.

(21) Appl. No.: 12/840,827

(22) Filed: Jul. 21, 2010

(65) Prior Publication Data

US 2011/0020201 A1 Jan. 27, 2011

Related U.S. Application Data (60) Provisional application No. 61/227,521, filed on Jul. 22, 2009.

(51) Int. Cl.
| | | |
|---|---|---|
| *B01J 23/00* | (2006.01) |
| *B01J 23/10* | (2006.01) |
| *B01J 23/32* | (2006.01) |
| *B01J 23/40* | (2006.01) |
| *B01J 23/42* | (2006.01) |
| *B01J 23/70* | (2006.01) |
| *B01J 23/74* | (2006.01) |
| *B01J 23/44* | (2006.01) |
| *B01J 23/02* | (2006.01) |
| *B01J 23/06* | (2006.01) |
| *B01J 23/04* | (2006.01) |
| *B01J 23/08* | (2006.01) |
| *F01N 3/10* | (2006.01) |

(52) U.S. Cl.
USPC ........... 502/303; 502/304; 502/324; 502/325; 502/326; 502/337; 502/338; 502/339; 502/343; 502/344; 502/352; 502/353; 502/355; 60/299

(58) Field of Classification Search
USPC ................ 502/302, 304, 324, 325, 326, 337, 502/338, 339, 343, 344, 347, 349, 352, 353, 502/355, 303; 60/299
See application file for complete search history.

(56) References Cited

U.S. PATENT DOCUMENTS

| 4,299,734 A | 11/1981 | Fujitani et al. |
| 4,927,799 A | 5/1990 | Matsumoto et al. |

(Continued)

FOREIGN PATENT DOCUMENTS

| CA | 2011484 | 10/1990 |
| EP | 0428752 | 5/1991 |

(Continued)

OTHER PUBLICATIONS

Maruya, Ken-Ichi, "Synergic enhancement effect of zirconium oxide, cerium oxide and iron or cobalt oxide on the formation of isobutene from CO and $H_2$", Catalysis Letters 24 (Abstract only) 1994, 1 pg.

(Continued)

*Primary Examiner* — Anthony J Zimmer
(74) *Attorney, Agent, or Firm* — Melanie L. Brown (57) ABSTRACT

Catalysts, systems and methods for abating emissions in an exhaust stream are provided. Systems comprising a transition metal oxide stabilized oxygen storage catalyst are described. The emissions treatment system is advantageously used for the treatment of exhaust streams from lean burn engines including diesel engines and lean burn gasoline engines.

26 Claims, 6 Drawing Sheets

(56) References Cited

U.S. PATENT DOCUMENTS

| | | | |
|---|---|---|---|
| 5,128,306 | A | 7/1992 | Dettling et al. |
| 5,147,842 | A | 9/1992 | Funabiki et al. |
| 5,260,249 | A | 11/1993 | Shiraishi et al. |
| 5,607,892 | A | 3/1997 | Chopin et al. |
| 5,693,299 | A | 12/1997 | Chopin et al. |
| 5,723,101 | A | 3/1998 | Cuif |
| 5,883,037 | A | 3/1999 | Chopin et al. |
| 5,898,014 | A | 4/1999 | Wu et al. |
| 5,908,800 | A | 6/1999 | Bonneau et al. |
| 5,911,960 | A | 6/1999 | Miyoshi et al. |
| 5,928,619 | A | 7/1999 | Bonneau et al. |
| 5,976,476 | A | 11/1999 | Blanchard et al. |
| 6,044,644 | A | 4/2000 | Hu et al. |
| 6,087,298 | A | 7/2000 | Sung et al. |
| 6,150,299 | A | 11/2000 | Umemoto et al. |
| 6,171,572 | B1 | 1/2001 | Aozasa |
| 6,204,219 | B1 | 3/2001 | Brezny et al. |
| 6,214,306 | B1 | 4/2001 | Aubert et al. |
| 6,228,799 | B1 | 5/2001 | Aubert et al. |
| 6,248,688 | B1* | 6/2001 | Wu et al. ............ 502/302 |
| 6,255,242 | B1 | 7/2001 | Umemoto et al. |
| 6,358,880 | B1* | 3/2002 | Hedouin et al. ............ 502/302 |
| 6,468,941 | B1* | 10/2002 | Bortun et al. ............ 502/300 |
| 6,585,944 | B1* | 7/2003 | Nunan et al. ............ 423/239.1 |
| 6,797,668 | B2 | 9/2004 | Yoshikawa |
| 7,247,597 | B2* | 7/2007 | Morikawa et al. ............ 502/304 |
| 7,632,769 | B2 | 12/2009 | Okamoto |
| 7,767,617 | B2 | 8/2010 | Larcher et al. |
| 7,781,365 | B2 | 8/2010 | Okamoto |
| 7,795,171 | B2 | 9/2010 | Maruki et al. |
| 7,820,586 | B2 | 10/2010 | Hedouin |
| 7,919,429 | B2 | 4/2011 | Okamoto et al. |
| 7,927,699 | B2 | 4/2011 | Okamoto |
| 7,939,040 | B2 | 5/2011 | Larcher et al. |
| 7,964,527 | B2 | 6/2011 | Larcher et al. |
| 8,158,551 | B2 | 4/2012 | Verdier et al. |
| 2002/0131914 | A1* | 9/2002 | Sung ............ 422/177 |
| 2003/0083194 | A1* | 5/2003 | Sung ............ 502/304 |
| 2004/0186016 | A1 | 9/2004 | Bog et al. |
| 2006/0052242 | A1* | 3/2006 | Iwakuni et al. ............ 502/304 |
| 2008/0020925 | A1 | 1/2008 | Larcher et al. |
| 2008/0187476 | A1 | 8/2008 | Larcher et al. |
| 2008/0318769 | A1 | 12/2008 | Wakamatsu et al. |
| 2009/0099014 | A1 | 4/2009 | Miura |
| 2009/0215614 | A1 | 8/2009 | Chane-Ching |
| 2010/0040523 | A1* | 2/2010 | Larcher et al. ............ 423/213.2 |
| 2010/0329954 | A1 | 12/2010 | Yokota et al. |
| 2011/0097252 | A1 | 4/2011 | Larcher et al. |
| 2012/0189517 | A1 | 7/2012 | Ifrah et al. |

FOREIGN PATENT DOCUMENTS

| | | |
|---|---|---|
| EP | 0628515 | 12/1994 |
| EP | 0629438 | 12/1994 |
| EP | 1118375 A2 | 7/2001 |
| EP | 1214967 A2 | 6/2002 |
| EP | 2000202 A1 | 12/2008 |
| EP | 2039425 A1 | 3/2009 |
| JP | 2-43951 | 2/1990 |
| JP | 4-55315 | 2/1992 |
| JP | 1992-284847 | 10/1992 |
| JP | 5-115780 | 5/1993 |
| JP | 6-63403 | 3/1994 |
| JP | 06-205975 | 7/1994 |
| JP | 06-296869 | 10/1994 |
| JP | 2005-270882 | 10/2005 |
| JP | 2006-043634 | 2/2006 |
| WO | WO-00/62923 | 10/2000 |
| WO | WO-2007/132253 A1 | 11/2007 |
| WO | WO 2007131901 A1 * | 11/2007 |
| WO | WO 2011/006780 | 1/2011 |

OTHER PUBLICATIONS

Chiou, Bi-Shiou , "Electrical Behavior of Ceria-Stabilized Zirconia with Rare-Earth Oxide Additives", *J. Am. Ceram. Soc.*, 73 [4] 866-871, 1990.

Cuif, Jean-Pierre et al., "(Ce,Zr)O2 Solid Solutions for Three-Way Catalysts", *SAE Technical Paper Series 970463* 1997, 15 pages.

Cuif, Jean-Pierre et al., "New Generation of Rare Earth Compounds for Automotive Catalysis", *SAE Technical Paper Series 961906* Oct. 1996, 11 pages.

De Leitenburg, Carla et al., "A Novel and Simple Route to Catalysts with a High Oxygen Storage Capacity: the Direct Room-temperature Synthesis of CeO2-ZrO2 Solid Solutions", *J. Chem. Soc., Chem. Commun.* 1995, 2181-2182.

Einarsdottir, G.H. et al., "Production of Zirconia (12 mol% CeO2) Powder by Supercritical Drying and Its Properties", *Technological Institute of Iceland*, 55-60.

Fornasiero, P. et al., "Modification of the Redox Behaviour of CeO2 Induced by Structural Doping with ZrO2", *Journal of Catalysis 164* 1996, 173-183.

Fornasiero, P. et al., "Rh-Loaded CeO2-ZrO2 Solid Solutions as Highly Efficient Oxygen Exchangers: Dependence of the Reduction Behavior and the Oxygen Storage Capacity on the Structural Properties", *Journal of Catalysis 151* 1994, 168-177.

Hirasawa, Yoshiro et al., "Study on New Characteristic CeO2-ZrO2 Based Material for Advanced TWC", *Society of Automotive Engineers, Inc.* 2009, 5 pages.

Hori, Carla E. et al., "Thermal Stability of Oxygen Storage Properties in a Mixed CeO2-ZrO2 System", *Applied Catalysis B: Environmental 16* 1998, 105-117.

Jenq-Gong, Duh et al., "Sintering, Microstructure, Hardness, and Fracture Toughness Behavior of Y2O3-CeO2-ZrO2", *J. Am. Ceram. Soc., 71* [10] 1988, 813-819.

Kaspar, J. et al., "Use of CeO2-based Oxides in the Three-way Catalysis", *Catalysis Today* 50 1999, 285-298.

Letichevsky, Sonia et al., "Obtaining CeO2-ZrO2 Mixed Oxides by Coprecipitation: Role of Preparation Conditions", *Applied Catalysis B: Environmental* 2005, 203-210.

Luccini, E. et al., "Preparation of zirconia-ceria powders by coprecipitation of a mixed xirconium carbonate in water with urea", *Int. J. of Materials and Product Tecynology*, vol. 4, No. 2 1989, 11 pgs.

Murota, T. et al., "Production Method of Cerium Oxide with High Storage Capacity of Oxygen and Its Mechanism", *Journal of Alloys and Compounds,* 193 1993, 298-299.

Nunan, J.G. et al., "Advanced TWC Technologies Using CeO2/ZrO2 Solid Solutions", *SAE Technical Paper Series 960798* Feb. 1996, 10 pages.

Ozawa, Msakun I et al., "The Application of Ce-Zr Oxide Solid Solution to Oxygen Storage Promoters in Automotive Catalysts", *Journal of Alloys and Compounds,* 193 1993, 73-75.

Permana, Haryani et al., "Reactor Evaluation of Ceria-Zirconia as an Oxygen Storage Material for Automotive Catalysts", *SAE Technical Paper Series 970462* 1997, 13 pages..

Pyda, W. et al., "Zirconia Stabilized with a Mixture of the Rare Earth Oxides", *Journal of the European Ceramic Society* 10 1992, 453-459.

Rohart, E. et al., "From Zr-Rich to Ce-Rich: Thermal Stability Of OSC Materials On The Whole Range Of Composition", *Topics in Catalysis* vols 30/31, Nos. 1-4 Jul. 2004, 417-423.

Rohart, E. et al., "High OSC CeO2/ZrO2 Mixed Oxides Used as Preferred Metal Carriers for Advanced Catalysts", *SAE Technical Paper Series* Apr. 2007, 11 pages.

Rohart, E. et al., "Innovative Materials with High Stability, High OSC, and Low Light-Off for Low PGM Technology", *SAE Technical Paper Series* Mar. 2004, 11 pages.

Sugiura, Masahiro , "Oxygen Storage Materials for Automotive Catalysts: Ceria-Zirconia Solid Solutions", *Catalysis Surveys from Asia* vol. 7, No. 1 Apr. 2003, 77-87.

Suzuki, Tadashi et al., "Alumina-Ceria-Zirconia Composite Oxide for Three-Way Catalyst", *R&D Review of Toyota CRDL* vol. 37 No. 4 Sep. 29, 2002, 28-33.

Tanaka, Hirohisa et al., "Improvement in Oxygen Storage Capacity", *SAE Technical Papers Series 960794* Feb. 1996, 10 pages.

Tsukuma, Koji et al., "Mechanical Properties and Thermal Stability of CeO2 Containing Tetragonal Zirconia Polycrystals", *Ceramic Bulletin*, vol. 65, No. 10 1986, 1386-1389.

Vidmar, Polona et al., "Effects of Trivalent Dopants on the Redox Properties of Ce0.6Zr0.4O2 Mixed Oxide", *Journal of Catalysis* 171 1997, 160-168.

Wongkaew, Akkarat, "Effect of Cerium Oxide and Zirconium Oxide to Activity of Catalysts", *Chiang Mai J. Sci.*; 35(1) 2008, 156-162.

Yashima, Masatomo et al., "Raman Scattering Study of Cubic-Tetragonal Phase Transition in Zr1-xCexO2 Solid Solution", *J. Am Ceram. Soc.*, 77 [4] 1994, 1067-1071.

\* cited by examiner

FIG. 1

| Rh + OSC |
| Pd |
| Substrate |

FIG. 2A
(prior art)

| M + OSC |
| Pd |
| Substrate |

FIG. 2B

| Pd |
| Rh + OSC |
| Substrate |

FIG. 3A
(prior art)

| Pd |
| M + OSC |
| Substrate |

OXYGEN STORAGE CATALYST WITH DECREASED CERIA REDUCTION TEMPERATURE

CROSS-REFERENCE TO RELATED APPLICATION

This application claims the benefit of U.S. Provisional Application No. 61/227,521, filed on Jul. 22, 2009, contents of which are hereby incorporated by reference in their entirety.

TECHNICAL FIELD

The present invention relates to emissions treatment systems and methods useful for reducing contaminants in exhaust gas streams. Specifically, embodiments of the invention are directed to ceria based oxygen storage catalyst materials promoted with transition metal oxides.

BACKGROUND

Three-Way Catalyst (TWC) compositions are polyfunctional, in that they have the capability of substantially simultaneously catalyzing both oxidation and reduction reactions, such as the oxidation of hydrocarbons and carbon monoxide and the reduction of nitrogen oxides in a gaseous stream. Such catalyst compositions find utility in a number of fields, including the treatment of the exhaust gases from internal combustion engines, such as automobile, truck and other gasoline-fueled engines.

"Close-coupled" catalysts are generally defined as located in the engine compartment, typically less than one foot, more typically less than six inches from, and commonly attached directly to, the outlet of the exhaust manifold. "Medium-coupled" catalysts are also known in the prior art and are generally defined as located (downstream of any close-coupled catalyst) usually not more than about twenty-four, typically eighteen, inches from the outlet of the exhaust manifold. Underfloor catalyst members are also known in the prior art and are located (downstream of any close-coupled and/or medium-coupled catalysts) under the floor of the vehicle adjacent to or in combination with the vehicle's muffler.

Motor vehicle exhaust treatment devices such as catalytic converters are conventionally located in underfloor position in the vehicle. For the purposes of the present invention, the term "vehicle" is to be understood as signifying a passenger car or truck and the term "engine" is to be understood as signifying a gasoline-powered internal combustion engine associated with the vehicle.

By the time engine exhaust gases travel from the outlet of the exhaust manifold through an exhaust pipe to a catalytic converter, the gases cool significantly relative to the temperature at or near the manifold, so that there is a significant period of a low rate of conversion of the pollutants in the exhaust gas stream before the exhaust gases heat the catalyst in the catalytic converter to its light-off temperature. Accordingly, during the cold start period of engine operation, there is a significant discharge of engine exhaust gas containing a relatively high amount of pollutants.

To reduce the level of pollutants in the exhaust gas stream, particularly the level of hydrocarbons and carbon monoxide, an air pump used in conjunction with the engine, can aid in the oxidation of such pollutants. However, vehicle manufacturers prefer to avoid using mechanical pollution control devices such as air pumps which, with their associated plumbing and mechanical parts, affect the engine architecture and are difficult to control without having an adverse impact on the optimum performance of the engine. Accordingly, vehicle manufacturers prefer to tune the engine for optimum performance without using mechanical types of a pollution control device and instead meet the vehicle emission standards discussed below solely with the use of catalyst members comprising one or more upstream catalyst bricks of the close-coupled and/or medium-coupled type and, if necessary, a catalytic converted located in an underfloor position. Increasingly stringent governmental emission standards require, however, that cold-start emissions be reduced.

The current "LEV" (low emission vehicle) standards in effect for all states other than California prohibit vehicle emissions above 0.08 gram of non-methane hydrocarbons per mile, 3.4 grams of carbon monoxide per mile and 0.2 gram of NOx (nitrogen oxides) per mile. Many vehicle manufacturers have difficulty in meeting the current standards solely with the use of available upstream and/or downstream catalyst compositions without the concurrent use of additional mechanical devices such as air pumps. Of even greater concern is the fact that the California Air Resource Board ("CARB") has promulgated new "ULEV" (ultra-low emission vehicle) standards that will prohibit vehicle emissions above 0.04 gram of non-methane hydrocarbons per mile, 1.7 grams of carbon monoxide per mile and 0.2 gram of NOx per mile. Moreover, based on historical trends in vehicle emission standards, it is likely that the new ULEV standards will be required nationwide within a few years. Unless an effective method of meeting the new ULEV standards can be rapidly developed and implemented, vehicle manufacturers face the difficult problem of achieving such standards without significant changes in engine/exhaust architecture, incorporation of additional mechanical pollution control devices and the use of large amounts of expensive precious metal-based catalyst systems.

A typical motor vehicle catalyst is an underfloor TWC which catalyzes the oxidation by oxygen in the exhaust gas of the unburned hydrocarbons and carbon monoxide and the reduction of nitrogen oxides to nitrogen. TWC catalysts which exhibit good activity and long life comprise one or more platinum group metals (e.g., platinum or palladium, rhodium rhodium and iridium) located upon a high surface area, refractory oxide support, e.g., a high surface area alumina coating. The support is carried on a suitable carrier or substrate such as a monolithic carrier comprising a refractory ceramic or metal honeycomb structure, or refractory particles such as spheres or short, extruded segments of a suitable refractory material.

Therefore, a need exists in the art for catalytic materials which are effective at lower operating temperatures and which utilize smaller amounts of platinum group metal components.

SUMMARY

One or more embodiments of the invention are directed to oxygen storage materials comprising a support including ceria, zirconia, and a rare earth oxide. The material is promoted with a transition metal oxide selected from the group consisting of iron oxide, cobalt oxide, nickel oxide, manganese oxide, silver oxide, gallium oxide, zinc oxide, gadolinium oxide, samarium oxide, indium oxide, gold oxide, bismuth oxide and tin oxide in the range of about 0.1% to about 10% by weight, and combinations thereof. The oxygen storage material of specific embodiments has the transition metal oxide surface dispersed on the support.

In detailed embodiments, the ceria has a reduction temperature at which ceria switches between oxidation states, and the transition metal oxide is present in amount sufficient to decrease the ceria reduction temperature by at least about 100° C. compared to a reference material that does not include an added transition metal.

In detailed embodiments, the oxygen storage material exhibits a ceria reduction temperature peak less than about 475° C. when the material has been aged in air at about 1000° C. for about 4 hours and tested by hydrogen Temperature Programmed Reduction (TPR) analysis in about 0.5% $H_2$/He. In other specific embodiments, the ceria reduction temperature peak is less than about 450° C. when measured under the same conditions.

Further embodiments of the invention are directed to catalysts for treating engine exhaust comprising the oxygen storage material previously described and a platinum group metal component. The platinum group metal component of specific embodiments is selected from the group consisting of palladium, rhodium, platinum and combinations thereof. In particular embodiments, the oxygen storage material is substantially free of rhodium. Other embodiments comprise palladium only as the platinum group metal component.

Additional embodiments of the invention are directed to emissions treatment systems for treating an exhaust stream from an engine. The treatments systems comprising a catalyst as previously described in flow communication with the exhaust stream.

The emissions treatment system of some embodiments, further comprises one or more of a diesel oxidation catalyst (DOC), a diesel particulate filter (DPF), a catalytic partial oxidation catalyst (CPO), an ammonia oxidation catalyst (AMOX), a reductant injector, an air injector, a hydrocarbon injector, a hydrocarbon selective catalytic reduction catalyst (HC-SCR), or an ammonia selective catalytic reduction catalyst ($NH_3$-SCR)

Further embodiments of the invention are directed to methods of treating an exhaust stream comprising passing the exhaust stream through, or contacting the exhaust stream with, a catalyst as previously described.

One or more embodiments of the invention are directed to layered catalysts comprising a substrate, a first washcoat layer comprising an oxygen storage material comprising ceria and zirconia and a transition metal oxide selected from the group consisting of iron oxide, cobalt oxide, nickel oxide, manganese oxide, silver oxide, gallium oxide, zinc oxide, gadolinium oxide, samarium oxide, indium oxide, gold oxide, tin oxide, bismuth oxide and combinations thereof, and a second washcoat layer comprising a platinum group metal component on a second support. In a detailed embodiment, the transition metal is surface dispersed in the first washcoat layer.

Some embodiments of the layered catalyst include an oxygen storage material further comprising a rare earth oxide other than ceria. In specific embodiments, there are substantially no platinum group metals in the first washcoat layer. In a specific embodiment, there is substantially no rhodium in the first washcoat layer.

In detailed embodiments of the first washcoat layer is on the substrate and the second washcoat layer is on the first washcoat layer. In other detailed embodiments, the second washcoat layer is on the substrate and the first washcoat layer is on the second washcoat layer. In other detailed embodiments, the first washcoat layer is adjacent to the second washcoat layer and both layers are in communication with the substrate.

DETAILED DESCRIPTION

Ceria ($CeO_2$) based oxygen storage component (OSC) materials are key components in treating emissions from an engine. Ceria has been used as a support for palladium (Pd), platinum (Pt) and rhodium (Rh) in treating hydrocarbon and NOx emissions from gasoline and diesel vehicles. One important property of ceria-based OSC materials is the ability of ceria to switch between the +4 and +3 oxidation states. This redox property makes ceria-based materials useful for various emissions treatment applications. Therefore, it is desirable to enhance the reducibility of ceria by lowering its reduction temperature. One or more embodiments of the invention show the effect of various transition metal oxides additives ($MO_x$) on the reducibility of ceria-based OSC and Rh/OSC catalysts.

The following terms shall have, for the purposes of this application, the respective meanings set forth below.

"Lean gaseous streams" including lean exhaust streams mean gas streams that have a $\lambda>1.0$.

"Lean periods" refer to periods of exhaust treatment where the exhaust gas composition is lean, i.e., has a λ>1.0.

"Platinum group metal components" and "platinum group metals" refer to precious metals as found in the platinum group, including but not limited to platinum, palladium, and rhodium, and/or one of their oxides.

"Rare earth metal components" refer to one or more oxides of the lanthanum series defined in the Periodic Table of Elements, including lanthanum, cerium, praseodymium and neodymium.

"Rich gaseous streams" including rich exhaust streams mean gas streams that have a λ<1.0.

"Rich periods" refer to periods of exhaust treatment where the exhaust gas composition is rich, i.e., has a λ<1.0.

"Washcoat" has its usual meaning in the art of a thin, adherent coating of a catalytic or other material applied to a refractory substrate, such as a honeycomb flow through monolith substrate or a filter substrate, which is sufficiently porous to permit the passage there through of the gas stream being treated.

"Flow communication" means that the components and/or conduits are adjoined such that exhaust gases or other fluids can flow between the components and/or conduits.

"Downstream" refers to a position of a component in an exhaust gas stream in a path further away from the engine than the component preceding component. For example, when a diesel particulate filter is referred to as downstream from a diesel oxidation catalyst, exhaust gas emanating from the engine in an exhaust conduit flows through the diesel oxidation catalyst before flowing through the diesel particulate filter. Thus, "upstream" refers to a component that is located closer to the engine relate to another component.

As used herein, "reduction temperature" refers to the temperature at which ceria switches between oxidation states. In a specific, non-limiting example, the reduction temperature refers to the ceria switching between the +4 and +3 oxidation state, including intermediate or mixed oxidation states.

As used herein, "surface dispersed" or "surface dispersing" of a transition metal oxide means that the transition metal oxide is substantially supported on the surface of a material. Although the surface dispersed transition metal oxide is not intentionally added to the bulk material there may be some migration of the transition metal oxide species into the bulk. Surface dispersed is contrasted with a transition metal oxide that is incorporated into the crystal structure of the support material or in solution with the components of the support material.

As used herein, "substantially no rhodium" and "substantially free of rhodium" mean that rhodium is not intentionally added to the composite. Trace amounts of rhodium may be inadvertently present, for example, at levels below about 1% by weight of the composition.

One or more embodiments of the invention are directed to oxygen storage materials comprising ceria, zirconia, and a rare earth oxide. The oxygen storage materials are promoted with a transition metal oxide. The transition metal oxide can be iron oxide, cobalt oxide, nickel oxide, manganese oxide, silver oxide, gallium oxide, zinc oxide, gadolinium oxide, samarium oxide, indium oxide, gold oxide, bismuth oxide, tin oxide and combinations thereof, any or all of which in the range of about 0.1% to about 10% by weight, and combinations thereof.

In some embodiments, the ceria in the oxygen storage material has a reduction temperature at which ceria switches between oxidation states, and the transition metal oxide is present in amount sufficient to decrease the ceria reduction temperature by at least about 100° C. compared to a reference material that does not include an added transition metal In various embodiments, the ceria in the oxygen storage material has a ceria reduction temperature peak less than about 475° C. when the catalyst has been aged in air at about 1000° C. for about 4 hours and tested by hydrogen Temperature Programmed Reduction (TPR) analysis in about 0.5% $H_2$/He. The oxygen storage material of further embodiments has a ceria reduction temperature peak less than about 450° C. when the catalyst has been aged in air at about 1000° C. for about 4 hours and tested by hydrogen Temperature Programmed Reduction (TPR) analysis in about 0.5% $H_2$/He.

In detailed embodiments, the oxygen storage material comprises ceria in the range of about 5% to about 95%, or in the range of about 5% to about 80% by weight, or in the range of about 20% to about 80%, or in the range of about 20% to about 60% by weight, or in the range of about 30% to about 70% by weight, or in the range of about 35% to about 60% by weight, or in the range of about 40% to about 50% by weight, or in the range of about 41% to about 48% by weight or in the range of about 42% to about 46% by weight. In a specific embodiment, the oxygen storage material has a ceria composition of about 44% by weight. In highly specific embodiments, the oxygen storage material comprises at least about 50% by weight ceria, at least about 55% by weight ceria, at least about 60% by weight ceria, at least about 65% by weight ceria, at least about 70% by weight ceria, at least about 75% by weight ceria, at least about 80% by weight ceria, at least about 85% by weight ceria, at least about 90% by weight ceria, or at least about at least about 95% ceria.

The oxygen storage material may comprise zirconia in the range of about 5% to about 80%, or in the range of about 20% to about 80%, or in the range of about 20% to about 60%, or in the range of 30% to about 70% by weight, or in the range of about 35% to about 60% by weight, or in the range of about 40% to about 50% by weight, or in the range of about 41% to about 48% by weight or in the range of about 42% to about 46% by weight. In a specific embodiment, the oxygen storage material has a zirconia composition of about 44% by weight.

The oxygen storage material may comprise one or more rare earth oxides in addition to the ceria. That is, the material can comprise one, two, three, or even four or more rare earth oxides. Suitable rare earth oxides include oxides of lanthanum (lanthana), praseodymium (praseodymia), neodymium (neodymia), promethium (promethia), samarium (samaria), europium (europia), gadolinium (gadolinia), terbium (terbia), dysprosium (dysprosia), holmium (holmia), erbium (erbia), thulium (thulia), ytterbium (ytterbia) and lutetium (lutetia). The rare earth oxide can be present in the range of about 0.1% to about 15% by weight, or in the range of about 0.25% to about 10% by weight, or in the range of about 0.5% to about 9% by weight, or in the range of about 1% to about 10% by weight, or in the range of about 1% to about 8% by weight, or in the range about 1% to about 5% by weight.

In detailed embodiments, the rare earth oxide comprises lanthana present in the range of about 1% to about 10% by weight, or in the range of about 2% to about 14% by weight, or in the range of about 2% to about 6% by weight, or in the range of about 4% to about 12% by weight, or in the range of about 6% to about 10% by weight or in the range of about 7% to about 9% by weight. In a specific embodiment, the lanthana is present at about 8% by weight.

In further detailed embodiments, the rare earth oxide comprises praseodymia present in the range of about 0.1% to about 10% by weight, or in the range of about 0.1% to about 5% by weight, or in the range of about 1% to about 5% by weight, or in the range of about 2% to about 6% by weight, or in the range of about 0.5% to about 4% by weight or in the range of about 1% to about 3% by weight. In a specific embodiment, the praseodymia is present at about 2% by weight.

The rare earth oxide can be a combination of two or more rare earth oxides where each individual rare earth oxide is present within a different range. In detailed embodiments, the oxygen storage material comprises lanthana present in the range of about 2% to about 14% by weight and praseodymia in the range of about 0.1% to about 5% by weight, or the lanthana is present in the range of about 4% to about 12% by weight and the praseodymia is in the range of about 0.5% to about 4% by weight, or the lanthana is present in the range of about 6% to about 10% by weight and the praseodymia is in the range of about 1% to about 3% by weight. In a specific embodiment, the oxygen storage material comprises about 8% lanthana and about 2% praseodymia by weight.

In a detailed embodiment, the oxygen storage material comprises ceria in the range of about 5% to about 80% by weight, zirconia in the range of about 5% to about 80% by weight, lanthana in the range of about 1% to about 10% by weight, yttria in the range of about 1% to about 10% by weight, praseodymia in the range of about 1% to about 5% by weight, neodymia in the range of about 1% to about 10% by weight; and the transition metal oxide is one or more of ferric oxide in the range of about 0.1% to about 5% by weight and cobalt oxide, nickel oxide, manganese oxide, silver oxide, gallium oxide, zinc oxide, gadolinium oxide, samarium oxide, indium oxide, gold oxide, tin oxide and bismuth oxide in the range of about 0.1% to about 10% by weight.

In another detailed embodiment, the oxygen storage material comprises ceria in the range of about 20% to about 60% by weight, zirconia in the range of about 20% to about 60% by weight, lanthana in the range of about 1% to about 10% by weight, yttria in the range of about 1% to about 10% by weight, praseodymia in the range of about 1% to about 5% by weight, neodymia in the range of about 1% to about 10% by weight; and the transition metal oxide is one or more of ferric oxide in the range of about 0.1% to about 5% by weight and cobalt oxide, nickel oxide, manganese oxide, silver oxide, gallium oxide, zinc oxide, gadolinium oxide, samarium oxide, indium oxide, gold oxide, tin oxide, bismuth oxide and combinations thereof in the range of about 0.1% to about 10% by weight In an exemplary embodiment, the oxygen storage material comprises about 45 parts ceria by weight, about 45 parts zirconia by weight zirconia, about 8 parts lanthana by weight and about 2 parts praseodymia by weight. The metal oxide component can be any of those described herein in the range of about 0.1% to about 10% by weight of the total oxygen storage material composition.

In another exemplary embodiment, the oxygen storage material comprises about 40 parts ceria by weight, about 50 parts zirconia by weight, about 5 parts lanthana by weight and about 5 parts praseodymia by weight. The metal oxide component can be any of those described herein in the range of about 0.1% to about 10% by weight of the total oxygen storage material composition.

In another exemplary embodiment, the oxygen storage material comprises about 40 parts ceria by weight, about 50 parts zirconia by weight, about 5 parts lanthana by weight and about 5 parts yttria by weight. The metal oxide component can be any of those described herein in the range of about 0.1% to about 10% by weight of the total oxygen storage material composition.

In another exemplary embodiment, the oxygen storage material comprises about 10 parts ceria by weight, about 75 parts zirconia by weight, about 2 parts lanthana by weight, about 5 parts neodymia by weight and about 8 parts yttria by weight. The metal oxide component can be any of those described herein in the range of about 0.1% to about 10% by weight of the total oxygen storage material composition.

In another exemplary embodiment, the oxygen storage material comprises about 64 parts ceria by weight, about 26 parts zirconia by weight, about 5 parts lanthana by weight and about 5 parts yttria by weight. The metal oxide component can be any of those described herein in the range of about 0.1% to about 10% by weight of the total oxygen storage material composition. In a preferred embodiment, silver oxide is the metal oxide component present in an amount in the range of 0.05 to 2.5% by weight of the material.

In another exemplary embodiment, the oxygen storage material comprises about 28 parts ceria by weight, about 58 parts zirconia by weight, about 7 parts neodymia by weight and about 7 parts praseodymia by weight. The metal oxide component can be any of those described herein in the range of about 0.1% to about 10% by weight of the total oxygen storage material composition.

The transition metal oxide can be any suitable transition metal oxide including, but not limited to, iron oxide, cobalt oxide, nickel oxide, manganese oxide, silver oxide, gallium oxide, zinc oxide, gadolinium oxide, samarium oxide, indium oxide, gold oxide and tin oxide. In detailed embodiments, the iron oxide is ferric oxide ($Fe_2O_3$), the cobalt oxide is cobaltous oxide (CoO), the nickel oxide is nickelous oxide (NiO) and the manganese oxide is a mixed oxide ($MnO_x$). In detailed embodiments, the transition metal oxide is present in the range of about 0.1% to about 10% by weight, or in the range of about 0.2% to about 8% by weight, or in the range of about 0.5% to about 6% by weight, or in the range of about 1% to about 5% by weight or in the range of about 2% to about 3% by weight. In some specific embodiments, the transition metal oxide is present at about 0.5% by weight. In other specific embodiments, the transition metal oxide is present at about 2% by weight. In further specific embodiments, the transition metal oxide is present at about 5% by weight.

According to some detailed embodiments, the transition metal oxide is surface dispersed on the ceria/zirconia oxygen storage material. The transition metal oxide is part of the crystal structure or in solid solution with the ceria/zirconia oxygen storage material composite.

Additional embodiments of the invention are directed to catalysts for treating engine exhaust. The catalysts comprise an oxygen storage material comprising ceria, zirconia, and a rare earth oxide. The oxygen storage materials promoted with a transition metal oxide. The transition metal oxide can be iron oxide, cobalt oxide, nickel oxide, manganese oxide, silver oxide, gallium oxide, zinc oxide, gadolinium oxide, samarium oxide, indium oxide, gold oxide and tin oxide, any or all of which in the range of about 0.1% to about 10% by weight, and combinations thereof. The catalyst also comprises a platinum group metal component.

The platinum group metal component can comprise any suitable precious metal including, but not limited to, palladium, rhodium, platinum and combinations thereof. In detailed embodiments, the catalyst has a platinum group metal loading in the range of about 1 $g/ft^3$ to about 300 $g/ft^3$. In other detailed embodiments, the catalyst has a platinum group metal loading in the range of about 1 $g/ft^3$ to about 200 $g/ft^3$. In further detailed embodiments, the catalyst has a platinum group metal loading greater than about 1 $g/ft^3$, 5 $g/ft^3$, 10 $g/ft^3$, 20 $g/ft^3$, 30 $g/ft^3$, 40 $g/ft^3$, 50 $g/ft^3$, 60 $g/ft^3$, 70 $g/ft^3$, 80 $g/ft^3$, 90 $g/ft^3$, 100 $g/ft^3$, 110 $g/ft^3$, 120 $g/ft^3$, 130 $g/ft^3$, 140 $g/ft^3$, 150 $g/ft^3$, 160 $g/ft^3$, 170 $g/ft^3$, 180 $g/ft^3$, 190 $g/ft^3$, 200 g/ft$^3$, 210 g/ft$^3$, 220 g/ft$^3$, 230 g/ft$^3$, 240 g/ft$^3$, 250 g/ft$^3$, 260 g/ft$^3$, 270 g/ft$^3$, 280 g/ft$^3$ or 290 g/ft$^3$.

Figure 1:
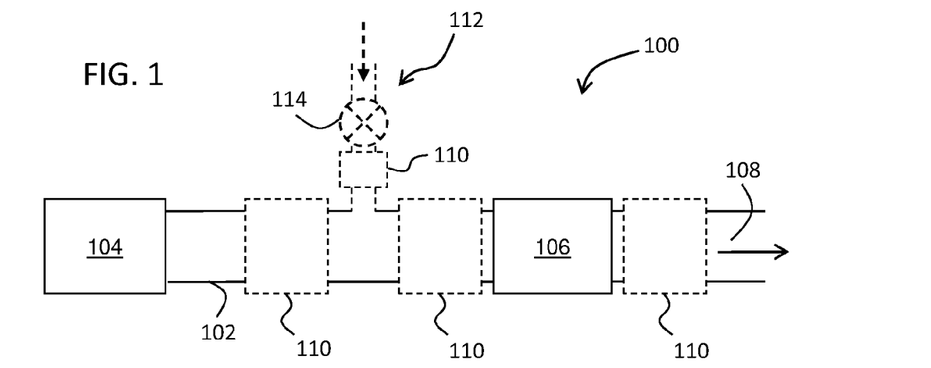
FIG. 1 is a schematic view showing an engine emission treatment system according to a detailed embodiment.

Further embodiments of the invention are directed to emissions treatment systems for treating an exhaust stream from an engine. FIG. 1 shows an emissions treatment system 100 according to one or more embodiments of the invention. An exhaust gas stream containing gaseous pollutants (e.g., unburned hydrocarbons, carbon monoxide, nitrogen oxides) and particulate matter is conveyed via an exhaust conduit 102 in flow communication with an engine 104. The emissions treatment system comprises a catalyst 106 in flow communication with the exhaust stream. The catalysts comprise an oxygen storage material comprising ceria, zirconia, and a rare earth oxide. The oxygen storage materials promoted with a transition metal oxide. The transition metal oxide can be iron oxide in the range of about 0.1% to about 5% by weight, cobalt oxide in the range of about 0.1% to about 10% by weight, nickel oxide in the range of about 0.1% to about 10% by weight, manganese oxide in the range of about 0.1% to about 10% by weight, and combinations thereof. The catalyst also comprises a platinum group metal component. After passing through the catalyst 106, the exhaust gas exits the system via the tail pipe 108. In the embodiment shown in FIG. 1, the engine 104 can be a gasoline engine, and catalyst 106 would be a three-way catalyst. Alternatively, the engine 104 can be a diesel engine, and catalyst 106 would be a diesel oxidation catalyst (DOC).

As will be appreciated, the composition of the exhaust gas of diesel engines and gasoline engines is different, and accordingly, different treatment strategies and catalysts will be used to treat engine exhaust from each type of engine. The present invention pertains to OSC materials which may find use in TWC and DOC type catalysts.

In embodiments in which engine 104 is a diesel engine, and catalyst 106 is a DOC, according to one or more embodiments, the emissions treatments system 100 can include optional additional exhaust system components 110. These additional components 110 can be located upstream or downstream of the catalyst 106. The additional exhaust system components 110 can be, for example, one or more of a diesel oxidation catalyst (DOC), a diesel particulate filter (DPF), a catalytic partial oxidation catalyst (CPO), an ammonia oxidation catalyst (AMOX), a reductant injector, an air injector, a hydrocarbon injector, a hydrocarbon selective catalytic reduction catalyst (HC-SCR) and an ammonia selective catalytic reduction catalyst (NH$_3$-SCR).

In additional embodiments, the emissions treatment system 100 includes at least one injector system 112. The injector system 112 can be configured to inject, for example, hydrocarbons, on-board fuel, a reductant, air, urea or ammonia. In some detailed embodiments, the injector system 112 includes a metering device 114 which is adapted to control the amount of material injected into the exhaust stream conduit 102. It is also conceivable that additional components 110 may be located within the injector system 112.

Additional embodiments of the invention are directed to methods of treating an exhaust stream. The methods comprise passing the exhaust stream through a catalyst comprising an oxygen storage material comprising ceria, zirconia, and a rare earth oxide. The oxygen storage materials promoted with a transition metal oxide. The transition metal oxide can be iron oxide, cobalt oxide, nickel oxide, manganese oxide, silver oxide, gallium oxide, zinc oxide, gadolinium oxide, samarium oxide, indium oxide, gold oxide and tin oxide, any or all of which in the range of about 0.1% to about 10% by weight, and combinations thereof. In specific embodiments, the catalyst also comprises a platinum group metal component.

Further embodiments of the invention are directed to layered catalysts. The layered catalysts comprise a substrate, a first washcoat layer and a second washcoat layer. The first washcoat layer comprises an oxygen storage material comprising ceria and zirconia. The oxygen storage material is promoted with a transition metal oxide selected from the group consisting of iron oxide, cobalt oxide, nickel oxide, manganese oxide, silver oxide, and combinations thereof. A second washcoat layer comprises a platinum group metal component on a support.

Some embodiments of the invention further comprise a rare earth oxide in the oxygen storage material. The rare earth oxide being any suitable oxide other than ceria, as described previously.

Figure 2A:
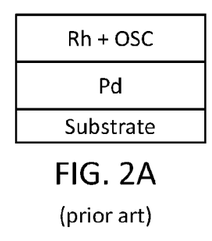
FIG. 2A shows a schematic view of a known layered catalyst.
Figure 2B:
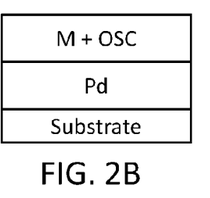
FIG. 2B shows a schematic view of a layered catalyst according to one or more embodiments.
Figure 3A:
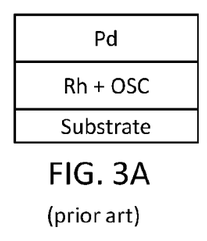
FIG. 3A shows a schematic view of a known layered catalyst.
Figure 3B:
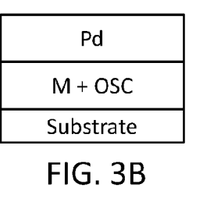
FIG. 3B shows a schematic view of a layered catalyst according to one or more embodiments.

The order of the layers on the substrate can be varied. FIG. 2A shows a traditional layered catalyst having a substrate with a first layer comprising a platinum group metal, specifically palladium. On top of the first layer is a second layer comprising rhodium and an oxygen storage catalyst. FIG. 2B shows a variation of the layered catalyst of FIG. 2A where at least a portion of the rhodium, and in some embodiments all of the rhodium, has been replaced with a transition metal. FIG. 3A shows a traditional layered catalyst similar to FIG. 2A with the layers reversed. FIG. 3B shows the layered catalyst with at least a portion, and in some embodiments, all of the rhodium has been replaced by a transition metal.

Figure 4A:
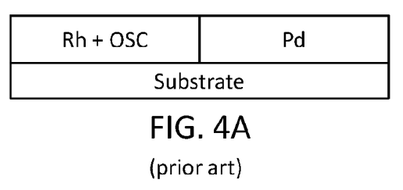
FIG. 4A shows a schematic view of a known layered catalyst.
Figure 4B:
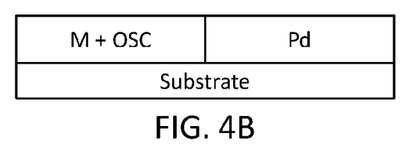
FIG. 4B shows a schematic view of a layered catalyst according to one or more embodiments.
Figure 5A:
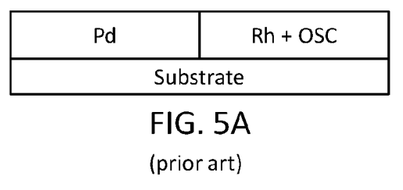
FIG. 5A shows a schematic view of a known layered catalyst.
Figure 5B:
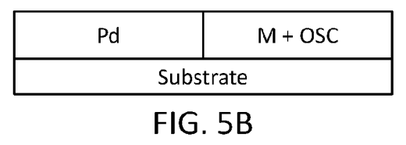
FIG. 5B shows a schematic view of a layered catalyst according to one or more embodiments.

In other detailed embodiments, the first layer and the second layer are adjacent each other, with both layers being on the substrate. FIG. 4A shows a traditional zoned catalyst where a rhodium modified OSC is at the first end of the substrate and a platinum group metal is located at the second end of the substrate. FIG. 4B shows a similar catalyst as that of FIG. 4A with at least a portion of the rhodium replaced with a transition metal in accordance with one or more embodiments of the invention. In some embodiments, all of the rhodium can be replaced by the transition metal. Here, both layers are in communication with the substrate. The layers may butt against each other or overlap by any degree. FIGS. 5A and 5B are analogous to FIGS. 4A and 4B, respectively, with the order of the zoning reversed.

In each of the embodiments discussed above with respect to FIGS. 2-5, the transition metal oxide can be iron oxide in the range of about 0.1% to about 5% by weight, cobalt oxide in the range of about 0.1% to about 10% by weight, nickel oxide in the range of about 0.1% to about 10% by weight, manganese oxide in the range of about 0.1% to about 10% by weight, and combinations thereof. According to embodiments of the invention any portion of the rhodium contained in a catalyst layer can be replaced, including 10%, 20%, 30%, 40%, 50%, 60%, 70%, 80%, 90%, 95% and up to 100% by weight.

In detailed embodiments, the transition metal oxide has a loading up to about 3 g/ft$^3$ based on the metal. In other detailed embodiments, the transition metal oxide has a loading up to about 2.5 g/ft$^3$, or up to about 2 g/ft$^3$, or up to about 1.5 g/ft$^3$, or up to about 1 g/ft$^3$ or up to about 0.5 g/ft$^3$ based on the oxide.

In a specific embodiment, the first layer has substantially no platinum group metals. As used in this specification and the appended claims, "substantially no platinum group metal" means that no metal has been intentionally added. It is possible, and acceptable, that platinum group metals may migrate from adjacent layers, or that trace amounts of platinum group metals may be present.

Substrates

In detailed embodiments, any or all of the catalysts, including the additional optional components, are disposed on a substrate. The substrate may be any of those materials typically used for preparing catalysts, and will typically comprise a ceramic or metal honeycomb structure, for example, a flow through monolith. Any suitable substrate may be employed, such as a monolithic substrate of the type having fine, parallel gas flow passages extending therethrough from an inlet or an outlet face of the substrate, such that passages are open to fluid flow therethrough (referred to as honeycomb flow through substrates). The passages, which are essentially straight paths from their fluid inlet to their fluid outlet, are defined by walls on which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 60 to about 600 or more gas inlet openings (i.e., cells) per square inch of cross section.

The substrate can be a flow through substrate in which the channels of the substrate are open at both ends, or a wall flow filter substrate in which the channels are alternately blocked. The channels are enclosed by the internal walls and alternate passages are plugged at the inlet end with inlet plugs, and at the outlet end with outlet plugs to form opposing checkerboard patterns at the inlet and outlet. A gas stream enters through the unplugged channel inlet is stopped by outlet plug and diffuses through channel walls (which are porous) to the outlet channels. The gas cannot pass back to the inlet side of walls because of inlet plugs. If such substrate is utilized, the resulting system will be able to remove particulate matter along with gaseous pollutants.

Honeycomb wall flow and flow through substrates can be composed of ceramic-like materials such as cordierite, α-alumina, silicon carbide, aluminum titanate, silicon nitride, zirconia, mullite, spodumene, alumina-silica-magnesia or zirconium silicate, or of porous, refractory metal. Wall flow substrates may also be formed of ceramic fiber composite materials. Specific wall flow substrates are formed from cordierite, silicon carbide, and aluminum titanate. Such materials are able to withstand the environment, particularly high temperatures, encountered in treating the exhaust streams.

The porous wall flow filter can be catalyzed in that the wall of the element has thereon or contained therein one or more catalytic materials. Catalytic materials may be present on the inlet side of the element wall alone, the outlet side alone, both the inlet and outlet sides, or the wall itself may consist all, or in part, of the catalytic material. This invention includes the use of one or more washcoats of catalytic materials and combinations of one or more washcoats of catalytic materials on the inlet and/or outlet walls of the element. The filter may be coated by any of a variety of means well known to the art.

The substrates useful for the catalysts of the present invention may also be metallic in nature and be composed of one or more metals or metal alloys. The metallic substrates may be employed in various shapes such as corrugated sheet or monolithic form. Suitable metallic supports include the heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least 15 wt. % of the alloy, e.g., 10-25 wt. % of chromium, 3-8 wt. % of aluminum and up to 20 wt. % of nickel. The alloys may also contain small or trace amounts of one or more other metals such as manganese, copper, vanadium, titanium and the like. The surface or the metal substrates may be oxidized at high temperatures, e.g., 1000° C. and higher, to improve the resistance to corrosion of the alloys by forming an oxide layer on the surfaces the substrates. Such high temperature-induced oxidation may enhance the adherence of the refractory metal oxide support and catalytically promoting metal components to the substrate.

In alternative embodiments, the catalyst may be deposited on an open cell foam substrate. Such substrates are well known in the art, and are typically formed of refractory ceramic or metallic materials.

EXAMPLES

Example 1

Transition Metal Promoted OSC Preparations

A powdered reference OSC material containing 45% ceria, 45% zirconia, 8% lanthana and 2% praseodymia was employed in the following experiments.

Modified OSC materials were prepared with 0.5%, 1%, 2% and 5% by weight of a select group of transition metal oxides $MO_x$ (M=Fe, Co, Ni, Mn) by impregnating a measured amount of acidic solution containing M onto 50 g of the reference OSC material. The solution was diluted in water to reach incipient wetness of the reference OSC material. The diluted solution was added drop wise over the powder while mixing. The powder was then dried and calcined at 550° C. for 2 hours.

Table 1 shows the list of select transition metal oxides, their precursors, and concentrations used for impregnation:

TABLE 1

| Additive | Precursor | Concentration(as Oxide) |
|---|---|---|
| $Fe_2O_3$ | $Fe(NO_3)_3 \cdot XH_2O$ | 19.41% |
| CoO | $(CH_3CO_2)_2Co \cdot 4H_2O$ | 30.10% |
| NiO | $Ni(NO_3)_2 \cdot 6H_2O$ | 25.20% |
| $MnO_x$ | $Mn(NO_3)_2 \cdot 6H_2O$ | 12.40% |

Catalyst Preparations

Samples containing 0.05% Rh by weight supported on a series of transition metal oxide ($MO_x$, M=Fe, Co, Ni, Mn) modified OSC materials, and OSC reference materials were prepared by impregnation. A measured amount of a $Rh(NO_3)_2$ solution (9.94% Rh) was impregnated onto 50 g of each of the transition metal promoted OSC materials. The $Rh(NO_3)_2$ was diluted in water to reach incipient wetness of each material. The diluted $Rh(NO_3)_2$ solution was added drop wise over the powder OSC with mixing. The powder was then dried and calcined at about 550° C. for about 2 hours. Table 2 shows the list of samples and their composition.

TABLE 2

| | Sample | $CeO_2$ | $ZrO_2$ | $La_2O_3$ | $Pr_6O_{11}$ | $Fe_2O_3$ | NiO | CoO | MnO |
|---|---|---|---|---|---|---|---|---|---|
| A | Reference | 45 | 45 | 8 | 2 | | | | |
| B | 0.5% $Fe_2O_3$ | 44.78 | 44.78 | 7.96 | 1.99 | 0.5 | | | |

TABLE 2-continued

| Sample | | $CeO_2$ | $ZrO_2$ | $La_2O_3$ | $Pr_6O_{11}$ | $Fe_2O_3$ | NiO | CoO | MnO |
|---|---|---|---|---|---|---|---|---|---|
| C | 1% $Fe_2O_3$ | 44.55 | 44.55 | 7.92 | 1.98 | 1 | | | |
| D | 2% $Fe_2O_3$ | 44.10 | 44.10 | 7.84 | 1.96 | 2 | | | |
| E | 5% $Fe_2O_3$ | 42.75 | 42.75 | 7.60 | 1.90 | 5 | | | |
| F | 10% $Fe_2O_3$ | 40.50 | 40.50 | 7.20 | 1.80 | 10 | | | |
| G | 2% NiO | 44.10 | 44.10 | 7.84 | 1.96 | | 2 | | |
| H | 5% NiO | 42.75 | 42.75 | 7.60 | 1.90 | | 5 | | |
| I | 2% CoO | 44.10 | 44.10 | 7.84 | 1.96 | | | 2 | |
| J | 5% CoO | 42.75 | 42.75 | 7.60 | 1.90 | | | 5 | |
| K | 2% MnO | 44.10 | 44.10 | 7.84 | 1.96 | | | | 2 |

Sample Characterization:

The transition metal oxide modified OSC powder samples and reference OSC sample were aged. Hydrogen-Temperature Program Reduction ($H_2$-TPR) analysis was performed on both fresh and aged powder samples to study the effect of MOx on the reducibility of the OSC. Samples were pretreated in 4% $O_2$/He at 450° C., followed by TPR experiments in 0.5% $H_2$/He up to 800° C.

Figure 6:
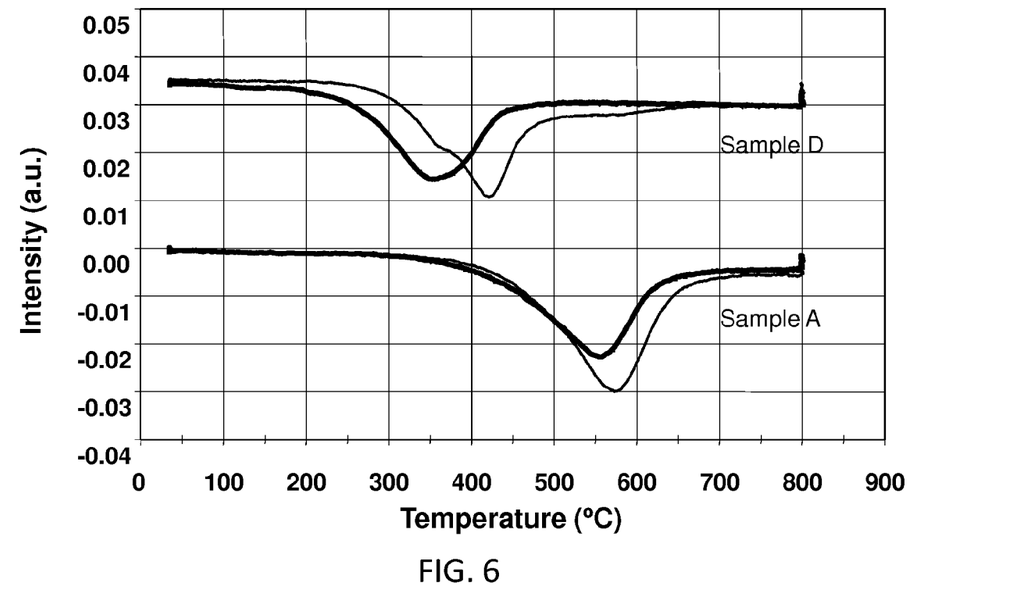
FIG. 6 shows a graph of intensity as a function of temperature from a hydrogen temperature programmed reduction experiment.

FIG. 6 shows the $H_2$-TPR results for fresh (broad lines) and aged (thin lines) powder samples. The results show that 2% $Fe_2O_3$ modified OSC material (Sample D) has a lower ceria reduction temperature compared to the reference OSC material (Sample A) by over 200° C. on fresh samples, and 150° C. on samples aged at 1000° C. for 4 hours in air. Without being bound by any particular theory of operation, it is believed that this difference can be attributed to an increase in the number of surface oxygen ion vacancies and hence greater mobility of surface $O_2$-ions.

The lower surface ceria reduction temperatures were also observed from $H_2$-TPR experiments on samples that have been aged in air with 10% steam, at 950° C. for 12 hours.

Table 3 summarizes the TPR results for both fresh and steam aged reference OSC Sample A, and Samples B through F which were modified with different $Fe_2O_3$ loadings ranging from 0.5% to 10% by weight.

TABLE 3

| Sample | | Condition | First Peak Maximum (° C.) | $H_2$ Consumption Volume (mL/g STP) |
|---|---|---|---|---|
| A | Reference | Fresh | 548.9 | 22.7 |
| | | 950° C. for 12 h in 10% steam | 667 | 14.9 |
| B | 0.5% $Fe_2O_3$ | Fresh | 422.5 | 17 |
| | | 950° C. for 12 h in 10% steam | 507 | 14.2 |
| C | 1% $Fe_2O_3$ | Fresh | 408 | 17.7 |
| | | 950° C. for 12 h in 10% steam | 505 | 19.1 |
| D | 2% $Fe_2O_3$ | Fresh | 351.2 | 24.8 |
| | | 950° C. for 12 h in 10% steam | 486 | 16.7 |
| E | 5% $Fe_2O_3$ | Fresh | 346.6 | 36.5 |
| | | 950° C. for 12 h in 10% steam | 506 | 17 |
| F | 10% $Fe_2O_3$ | Fresh | 360.5 | 54.7 |
| | | 950° C. for 12 h in 10% steam | 521 | 20.9 |

The results showed that as little as 0.5% by weight $Fe_2O_3$ (Sample B) triggered a decrease in the $Ce^{4+}$ to $Ce^{3+}$ reduction temperature by more than 130° C. compared to the reference sample A.

For Samples E and F, the total $H_2$ consumption was much more than that from the reference OSC (Sample A) alone. Additionally, multiple reduction peaks were observed at higher temperatures (>580° C.) in the $H_2$-TPR experiments. This may indicate that $Fe_2O_3$ loadings at these levels created extra surface oxygen ion vacancies and that at higher temperature (>580° C.) a portion of the $H_2$ consumption resulted from the reduction of $Fe_2O_3$ itself.

Table 4 shows the BET surface area of materials A through F, after aging at 950° C. for 12 hours in 10% steam/air. When the $Fe_2O_3$ loading was greater than about 2% by weight the BET surface area of the material decreased dramatically.

TABLE 4

| Sample | | Aged BET($m^2$/g) (950° C./ 12 hr/10% steam in air) |
|---|---|---|
| Reference OSC | A | 44.7 |
| $Fe_2O_3$ Modified OSC | B | 31.0 |
| | C | 19.5 |
| | D | 10.3 |
| | E | 10.7 |
| | F | 9.8 |

Figure 7:
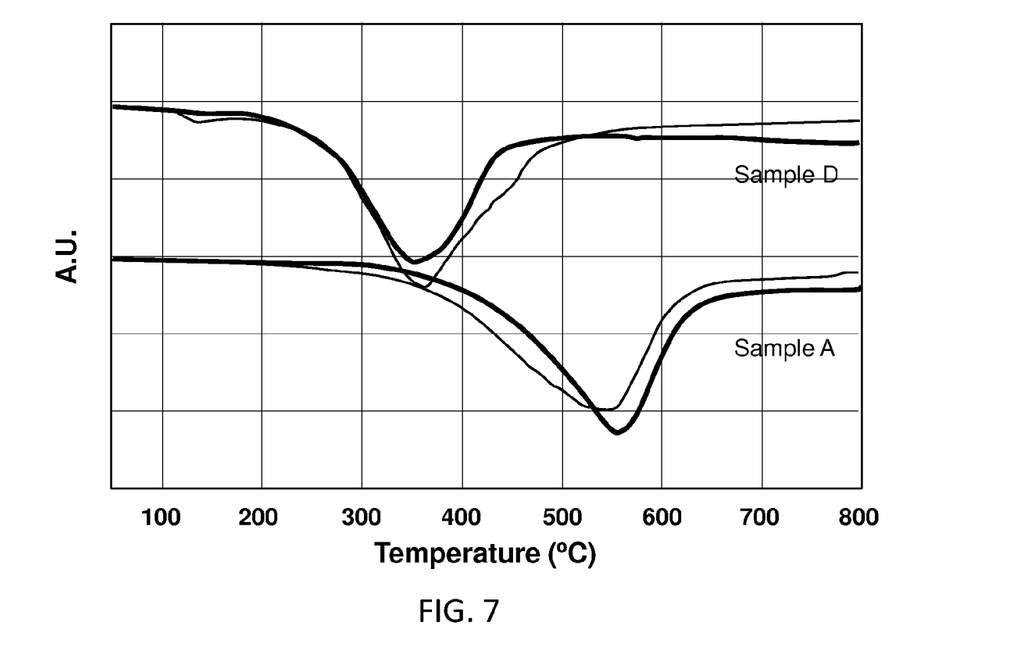
FIG. 7 shows a graph of intensity as a function of temperature from a hydrogen temperature programmed reduction experiment.

To study the redox properties of the samples, each sample was cooled in He to 600° C. after the 1st TPR experiment. The samples were then re-oxidized at 600° C. for 30 min in 4% $O_2$/He, cooled to room temperature in He, followed by a 2nd TPR analysis in 0.5% $H_2$/He up to 800° C. FIG. 7 shows the first TPR (broad line) and the second TPR (thin line) for reference OSC Sample A and Sample D (2% $Fe_2O_3$ modified OSC). The results show that the temperature shift was maintained after several reduction-oxidation recycles.

Figure 8:
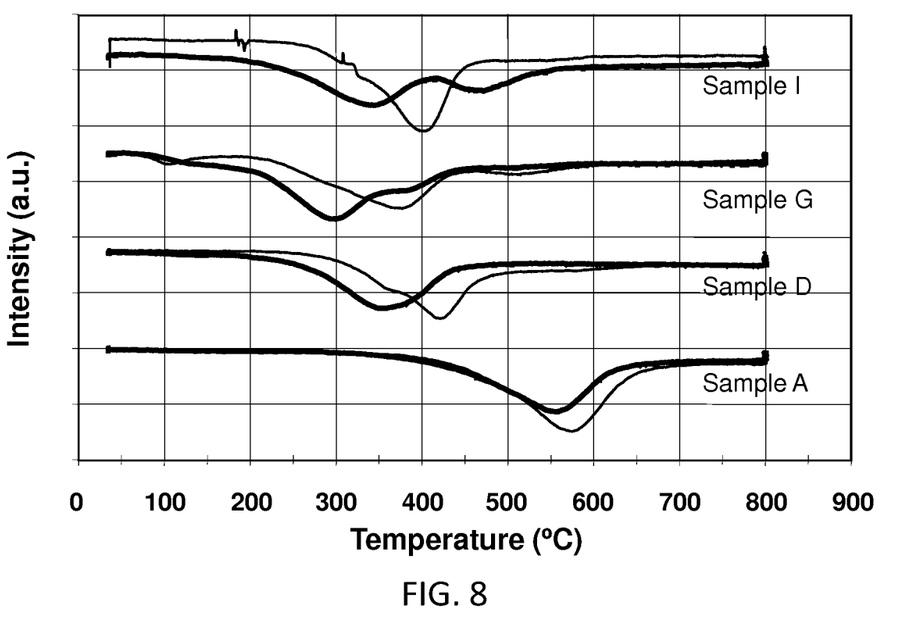
FIG. 8 shows a graph of intensity as a function of temperature from a hydrogen temperature programmed reduction experiment.

FIG. 8 shows the TPR results of fresh (broad lines) and aged (thin lines) samples. The aged samples were held at 1000° C. for 4 hours in air. The results indicated that other transition metal oxide modified OSC materials (Samples G and I) also had higher surface oxygen ion mobility, as indicated by the lower ceria reduction temperatures compared to the reference Sample A.

Figure 9:
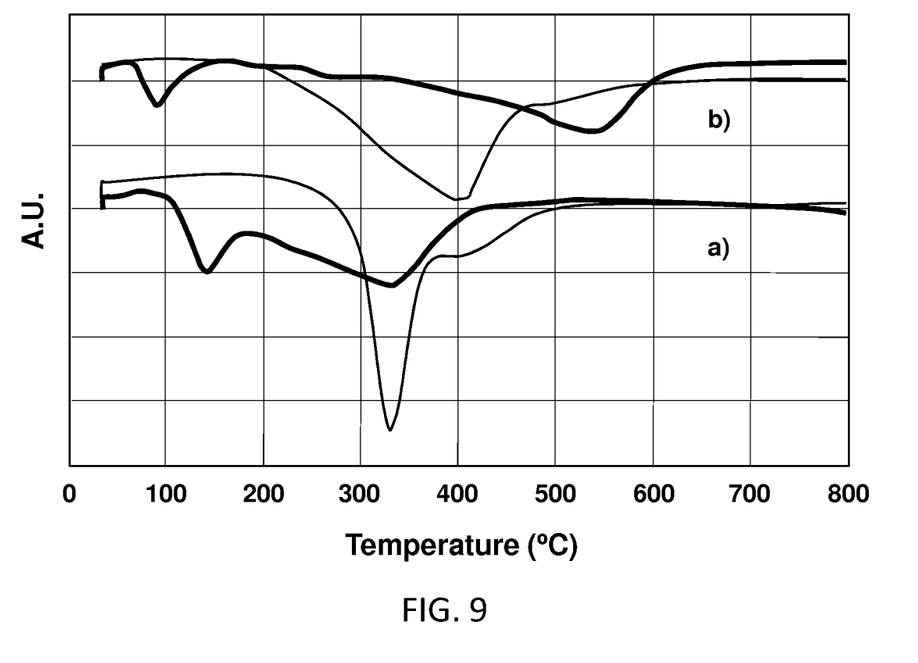
FIG. 9 shows a graph of intensity as a function of temperature from a hydrogen temperature programmed reduction experiment.

FIG. 9 shows the TPR results of fresh (broad lines) and aged (thin lines) samples having 0.5% Rh supported on the OSC material, a) OSC D; b) OSC A (ref). The samples were aged at 1000° C. for 4 hours in air prior to analysis.

Performance

A lab reactor test was used to measure the performance of Rh supported reference OSC and modified OSC samples. All samples were aged at 1050° C. for 12 hours aged. Equal volumes of aged catalysts were used to achieve the same Gas Hourly Space Velocity of about 120,000 $h^{-1}$.

Aged powder samples were tested under rich and lean conditions. Propylene and methane oxidation activities over reference Rh on reference OSC and Rh on experimental modified OSC samples were studied. Rich studies were performed with a λ of 0.988. Lean studies were performed with a λ of 1.026. The results are shown in Table 5.

TABLE 5

| Condition | Concentration (ppm) | | | | |
|---|---|---|---|---|---|
| | $CH_4$ | $C_3H_6$ | CO | NO | $O_2$ |
| Rich | 1000 | 300 | 7500 | 1500 | 4000 |
| Lean | 1000 | 300 | 7500 | 1500 | 12000 |

The samples were then compared in a combinatorial reactor under lean ($\lambda$=1.026) and rich ($\lambda$=0.988) conditions after thermal aging at 1050° C. for 12 hours. Under rich condition, CoO and $Fe_2O_3$ modified OSC samples showed over 60% higher NOx conversion at 300° C., and over 50% higher propylene conversion at 350° C. Under lean condition, CoO and NiO modified OSC samples showed over 20% higher propylene conversion at 350° C. compared to the reference sample.

Figure 10:
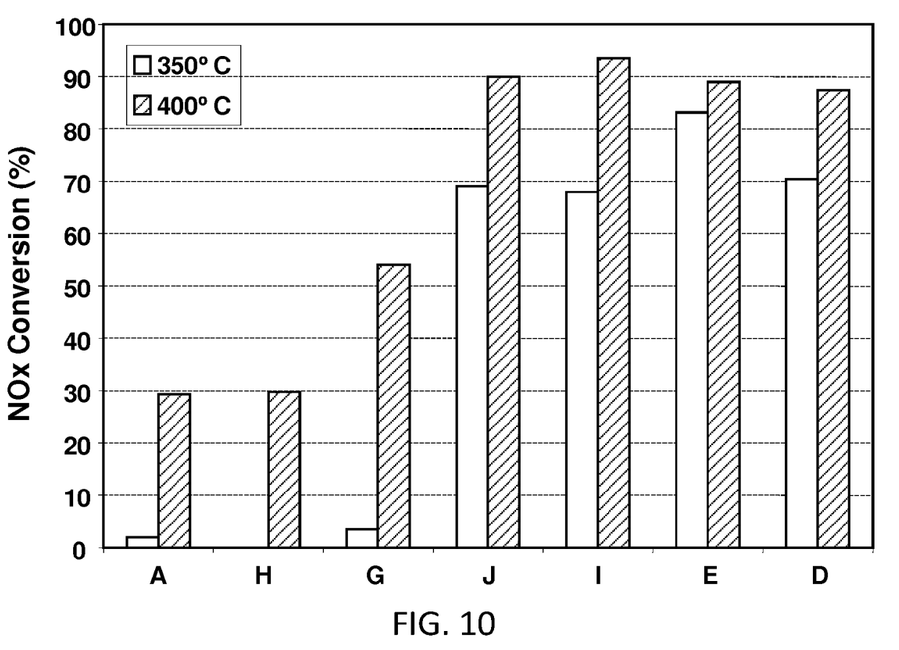
FIG. 10 shows a graph of the NOx conversion under slightly rich conditions for various samples at 350° C. and 400° C.
Figure 11:
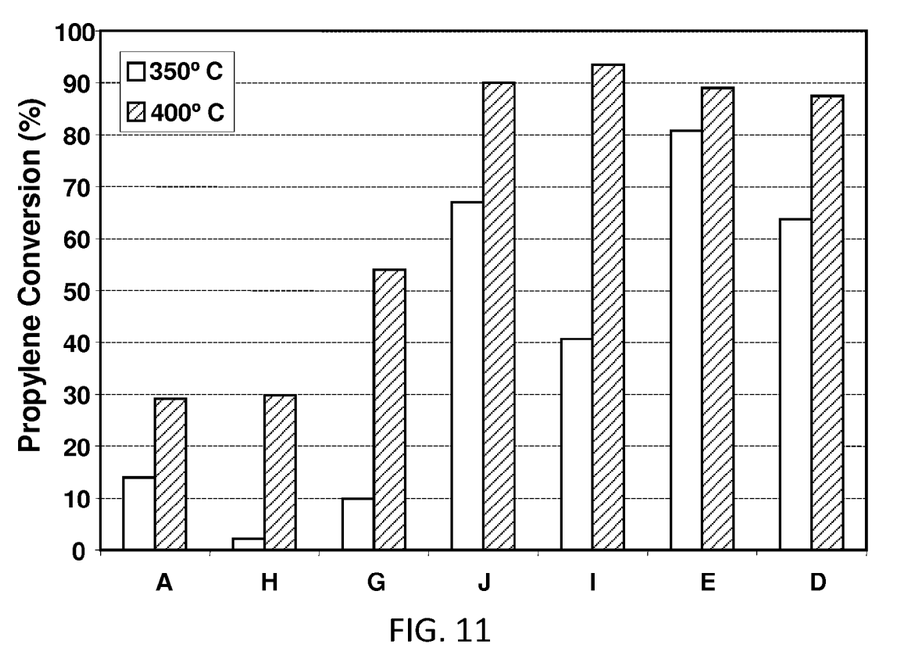
FIG. 11 shows a graph of the propylene conversion under slightly rich conditions for various samples at 350° C. and 400° C.

A reaction which mimics slightly rich conditions in a gasoline vehicle was tested and the NOx reduction and propylene oxidation activities over reference Rh on OSC and Rh on experimental modified OSC materials was studied. The results of NOx conversion measured at 350° C. and 400° C. (FIG. 10), and propylene conversion measured at 350° C. and 400° C. (FIG. 11) are shown. Significantly higher NOx and propylene conversion were achieved for Rh supported on transition metal oxides modified OSC compared to reference Rh supported reference OSC materials. CoO and $Fe_2O_3$ modified OSC samples showed over 50% higher NOx conversion at 350° C., and over 50% higher propylene conversion at 350° C. The significant enhancement in NOx and propylene conversion over Rh/transition metal modified OSC resulted in improved hot performance during transient engine conditions. The significant enhancement in propylene conversion over Rh/transition metal modified OSC may also results in improving the hydrocarbon light off activity in gasoline vehicles during cold start.

Figure 12:
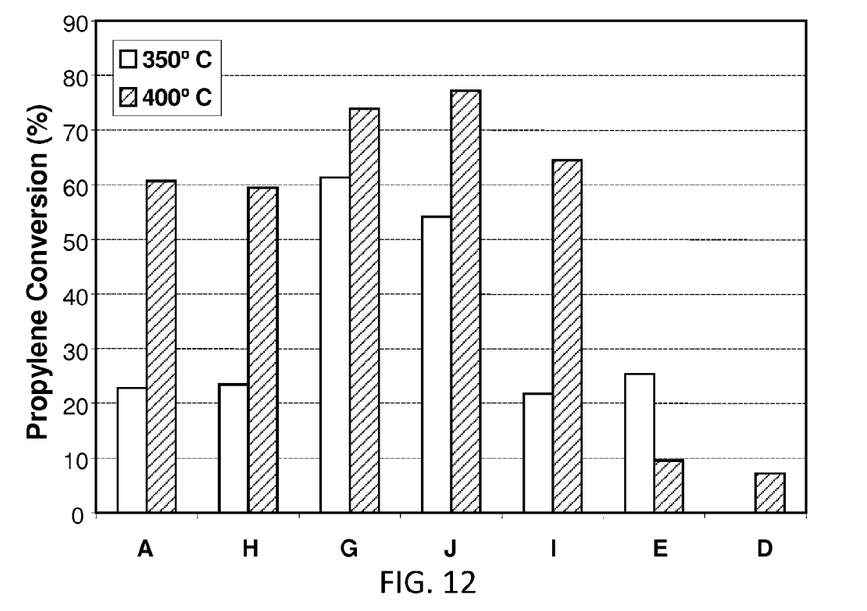
FIG. 12 shows a graph of the propylene conversion under slightly lean conditions for various samples at 350° C. and 400° C.

Studies done at slightly lean conditions, which may represent certain transient in gasoline vehicle testing, were performed. The results, shown in FIG. 12, illustrate the advantage of the Rh supported on NiO or CoO modified OSC materials compared to that of reference OSC materials. Under lean condition, CoO and NiO modified OSC samples showed over 20% higher propylene conversion at 350° C. compared to the reference sample. This shows that these composite materials are very useful in gasoline three-way conversion applications.

Three-Layered Catalysts

Studies were performed on three-layered catalysts with a non-platinum group metal containing undercoat, a palladium containing middle coat and a rhodium containing top coat. The substrate for each of the following samples was 4.66"× 4.5" with a CPSI=600/4.

Comparative Sample L

To form the undercoat, alumina and OSC A (Reference) were made into a slurry with water. The pH of the slurry was adjusted to about 4 using acetic acid and $ZrO_2$ (as the acetate). The slurry was milled to about 90% less than 10 μm and was then coated onto the substrate to a total loading of about 0.86 g/in³.

A middle coat was formed by impregnating palladium onto alumina and made into a slurry with water and nitric acid. The slurry was milled to about 90% of the particles less than 12 μm. OSC A (Reference) was added into the slurry and the pH was lowered to about 4 using acetic acid and nitric acid. The slurry was then milled to about 90% of the particles having a size less than about 10 μm. The slurry was then coated onto the substrate to a washcoat loading of about 1.616 g/in³.

A top coat was formed by impregnating rhodium onto alumina and forming a slurry in water and nitric acid. The slurry was milled until about 90% of the particles were less than 12 μm and an OSC (about 10% ceria, 75% zirconia, 8% yttria, 5% neodymia and 2% lanthana) was added into the slurry and the pH was lowered to about 4 using acetic acid and nitric acid. The slurry was milled until about 90% of the particles were less than 10 μm and then coated onto a substrate to a washcoat loading of about 0.902 g/in³.

The sample was engine aged using exothermic aging at about 1070° C. for 80 hours.

Samples M-O

The same procedure as that of Comparative Sample L was followed, replacing the OSC A in the undercoat and/or bottom coat with other OSC materials. The OSC used in the top coat is the same for Samples L-O.

Samples L-O compositions (g/in³) are summarized in Table 6.

TABLE 6

| | Comparative Sample L | M | N | O |
|---|---|---|---|---|
| Under Coat | | | | |
| OSC A | 0.600 | — | — | — |
| OSC B | — | 0.600 | 0.600 | — |
| OSC D | — | — | — | 0.600 |
| Middle Coat | | | | |
| OSC A | 1.000 | 1.000 | — | 1.000 |
| OSC B | — | — | 1.000 | — |
| Pd-N | 0.0156 | 0.0156 | 0.0156 | 0.0156 |
| Top Coat | | 0.0017 Rh | | |
| Total Washcoat Load | 3.337 | 3.337 | 3.337 | 3.337 |

Figure 13:
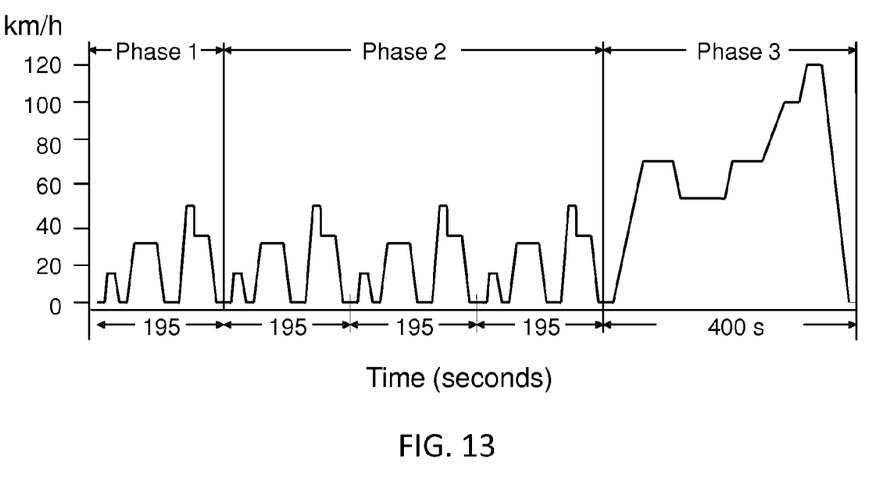
FIG. 13 shows testing conditions for three layer catalysts according to one or more embodiments of the invention.
Figure 14:
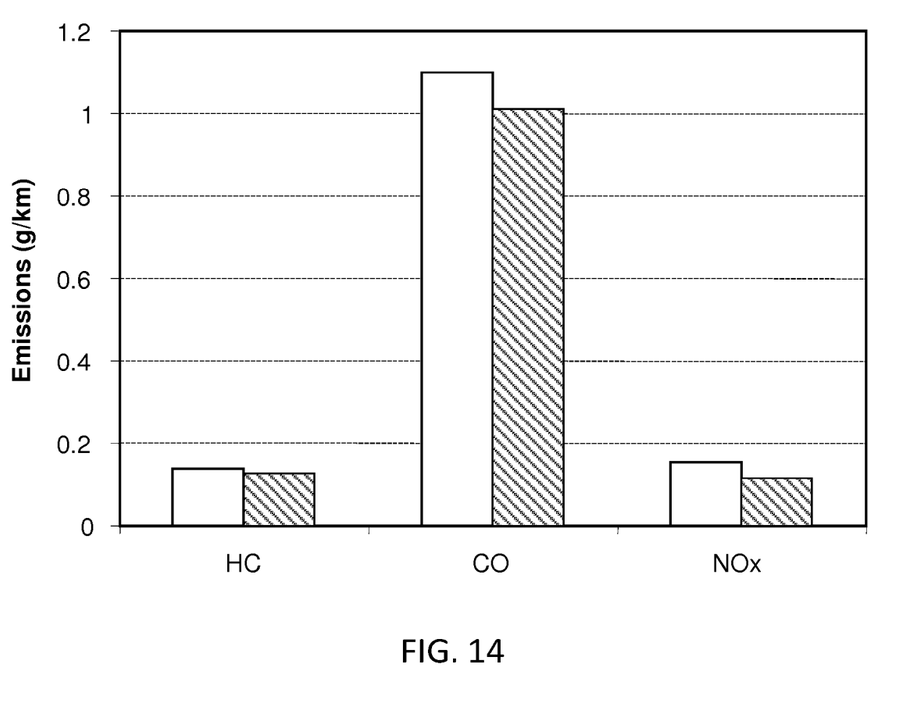
FIG. 14 shows a graph of the tail pipe hydrocarbon, carbon monoxide and $NO_x$ emissions for various samples.

Engine testing of Samples L-O was performed using an MP5 VW bench engine. European vehicle testing cycle (MVEG) was used, tailpipe HC/CO/NOx emissions were measured during the testing cycle. A three phase test was performed with the simulated driving conditions shown in FIG. 13. The total testing time was 1180 seconds, with Phase 1 being representative of a cold start, Phase 2 representative of city driving and Phase 3 representative of highway driving. Smaller numbers indicate higher conversions. The total simulated distance was 11.012 km with an average speed of 32.5 km/h and a maximum speed of 120 km/h. The results are shown in Table 7 and FIG. 14.

TABLE 7

| | Sample L | Sample N | Improvement |
|---|---|---|---|
| Hydrocarbon (g/km) | 0.137 | 0.126 | 8.03% |
| CO (g/km) | 1.10 | 1.01 | 8.18% |
| NOx (g/km) | 0.155 | 0.114 | 26.45% |

The results of these tests showed that the use of OSC B (0.5% $Fe_2O_3$) in both the under coat and the bottom coat resulted in improved hydrocarbon, carbon monoxide and NOx conversion activity.

Example 2

A three-way conversion catalyst composite having a catalytic material was prepared using two layers: a bottom coat and a top coat. The layered catalyst composite contained only palladium as a platinum group metal with a total platinum group metal loading of 90 g/ft³ and with a Pt/Pd/Rh ratio of 0/90/0. The substrate for each of the following samples was 105.7 mm (D)×114 mm (L) with a CPSI=400/3.5.

Comparative Sample P

Of the total palladium in the catalytic material, ~20% was put into the bottom coat. To prepare the bottom coat, one-half of the palladium for the bottom coat was impregnated in the form of palladium nitrate and calcined onto a combination of two alumina raw materials along with a barium component (for phosphorous trapping). The other half of the palladium was impregnated in the form of palladium nitrate and calcined onto a combination of two materials, a first material was a zirconia composite (27.8% of the two materials) (about 75% zirconia, 10% yttria, 10% neodymia and 5% lanthana) and second material that was an OSC ("OSC Y Reference") (72.2% of the two materials) (about 64% ceria, 26% zirconia, 5% yttria, and 5% lanthana). These impregnated and calcined powders were made into a slurry with water and nitric acid. The slurry was milled until about 90% of the particles were less than 12 μm. A binder material and zirconium nitrate were added to the slurry, which was then milled to about 90% of the particles less than 10 μm. The slurry was then coated onto the substrate to a washcoat loading of about 1.46 g/in³.

The top coat was prepared by impregnating the remaining palladium (~80% of the total palladium in the catalytic material) in the form of palladium nitrate onto alumina and forming a slurry in water and nitric acid. The slurry was milled until about 90% of the particles were less than 12 μm. An OSC ("OSC Z") (about 40% ceria, 50% zirconia, 5% yttria, and 5% lanthana), a binder material, and zirconium nitrate were added into the slurry, which was then milled until about 90% of the particles were less than 10 μm. The slurry was then coated onto a substrate to a washcoat loading of about 1.867 g/in³.

Sample Q

The bottom coat of Sample Q was prepared as described for the bottom coat of Comparative Sample P, except that rather than use OSC Y Reference), a modified version of OSC Y Reference having 0.1% $Ag_2O$ added to it was used.

The top coat of Sample Q was prepared as described for the top coat of Comparative Sample P.

Comparative Sample P and Sample Q were engine aged using fuel cut aging at about 950° C. for 100 hours.

Comparative Sample P and Sample Q compositions (g/in³) are summarized in Table 8.

TABLE 8

|  | Comparative Sample P | Q |
|---|---|---|
| Bottom Coat |  |  |
| OSC Y Reference* | 0.65 | — |
| OSC Y modified with 0.1% $Ag_2O$ | — | 0.65 |
| Pd-N | 0.01042 | 0.01042 |
| Top Coat |  |  |
| OSC Z** | 0.25 | 0.25 |
| Pd-N | 0.0417 | 0.0417 |
| Total Washcoat Load | 3.327 | 3.327 |

*64% ceria, 26% zirconia, 5% yttria, and 5% lanthana;
**40% ceria, 50% zirconia, 5% yttria, and 5% lanthana.

Engine testing of Comparative Sample P and Sample Q was performed using a MY2008 PZEV engine. An FTP testing cycle was used, where mid-bed HC/CO/NOx emissions were measured during the testing cycle. Smaller numbers indicate higher conversions. The results are shown in Table 9.

TABLE 9

|  | Comparative Sample P | Sample Q | Improvement |
|---|---|---|---|
| Mid-Bed Emission (g/mile) |  |  |  |
| Hydrocarbon (g/km) | 0.021 | 0.021 | — |
| CO (g/km) | 1.55 | 1.343 | 13.36% |
| NOx (g/km) | 0.235 | 0.199 | 15.32% |

The results of these tests showed that the use of OSC Y modified (0.1% $Ag_2O$) in both the bottom coat resulted in improved hydrocarbon, carbon monoxide and NOx conversion activity.

While this invention has been described with an emphasis upon preferred embodiments, it will be obvious to those of ordinary skill in the art that variations in the preferred devices and methods may be used and that it is intended that the invention may be practiced otherwise than as specifically described herein. Accordingly, this invention includes all modifications encompassed within the spirit and scope of the invention as defined by the claims that follow.

What is claimed:

1. An oxygen storage material comprising a support including:
   ceria in the range of about 5% to about 95% by weight;
   zirconia in the range of about 5% to about 80% by weight;
   lanthana in the range of about 4% to about 12% by weight;
   one or more rare earth oxides in addition to ceria and lanthana, selected from
   praseodymia in the range of about 1% to about 5% by weight;
   yttria in the range of about 1% to about 10% by weight;
   neodymia in the range of about 1% to about 10% by weight; and
   the transition metal oxide is one or more of ferric oxide, cobalt oxide, nickel oxide, manganese oxide, silver oxide, gallium oxide, zinc oxide, gadolinium oxide, samarium oxide, indium oxide, gold oxide, tin oxide and bismuth oxide in the range of about 0.1% to about 10% by weight, wherein the transition metal oxide is surface dispersed on the support.

2. The oxygen storage material of claim 1, wherein the ceria has a reduction temperature at which ceria switches between oxidation states, and the transition metal oxide is present in amount sufficient to decrease the ceria reduction temperature by at least about 100° C. compared to a reference material that does not include an added transition metal.

3. The oxygen storage material of claim 1, wherein the oxygen storage material exhibits a ceria reduction temperature peak less than about 475° C. when the material has been aged in air at about 1000° C. for about 4 hours and tested by hydrogen Temperature Programmed Reduction (TPR) analysis in about 0.5% $H_2$/He.

4. The oxygen storage material of claim 1 comprising:
   ceria in the range of about 62% to about 66% by weight;
   zirconia in the range of about 24% to about 28% by weight;
   lanthana in the range of about 6% to about 10% by weight;
   yttria in the range of about 3% to about 7% by weight; and
   the transition metal oxide is silver oxide in the range of about 0.1% to about 2.5% by weight.

5. A catalyst for treating engine exhaust comprising the oxygen storage material of claim 1 and a platinum group metal component.

6. The catalyst of claim 5, wherein the platinum group metal component is selected from the group consisting of palladium, rhodium, platinum and combinations thereof.

7. The catalyst of claim 6, wherein the platinum group metal component has a loading in the range of about 1 g/ft$^3$ to about 300 g/ft$^3$.

8. An emissions treatment system for treating an exhaust stream from an engine, comprising the catalyst of claim 5 in flow communication with the exhaust stream.

9. The emissions treatment system of claim 8, wherein the transition metal oxide comprises silver oxide and is present in an amount in the range of 0.1 to 2% by weight of the oxygen storage material.

10. The emissions treatment system of claim 8, wherein the oxygen storage material exhibits a ceria reduction temperature peak less than about 475° C. when the material has been aged in air at about 1000° C. for about 4 hours and tested by hydrogen Temperature Programmed Reduction (TPR) analysis in about 0.5% $H_2$/He.

11. The emissions treatment system of claim 9, further comprising one or more of a diesel oxidation catalyst (DOC), a diesel particulate filter (DPF), a catalytic partial oxidation catalyst (CPO), an ammonia oxidation catalyst (AMOX), a reductant injector, an air injector, a hydrocarbon injector, a hydrocarbon selective catalytic reduction catalyst (HC-SCR), or an ammonia selective catalytic reduction catalyst ($NH_3$-SCR).

12. A layered catalyst comprising:
a substrate;
a first washcoat layer comprising the oxygen storage material of claim 1, comprising the support having a transition metal oxide surface dispersed thereon; and
a second washcoat layer comprising a platinum group metal component on a second support.

13. The layered catalyst of claim 12, wherein the first washcoat layer comprises substantially no rhodium.

14. The layered catalyst of claim 12, wherein the first layer is on the substrate and the second layer is on the first layer.

15. The layered catalyst of claim 12, wherein the platinum group metal component is palladium.

16. An emissions treatment system for treating an exhaust stream from an engine, comprising the catalyst of claim 15 in flow communication with the exhaust stream.

17. The emissions treatment system of claim 16, wherein the transition metal oxide comprises silver oxide and is present in an amount in the range of 0.1 to 2% by weight of the oxygen storage material.

18. The emissions treatment system of claim 16, wherein the oxygen storage material exhibits a ceria reduction temperature peak less than about 475° C. when the material has been aged in air at about 1000° C. for about 4 hours and tested by hydrogen Temperature Programmed Reduction (TPR) analysis in about 0.5% $H_2$/He.

19. The layered catalyst of claim 12, wherein the transition metal oxide has a loading up to about 3 g/ft$^3$.

20. An oxygen storage material a support including:
ceria in the range of about 42% to about 46% by weight;
zirconia in the range of about 42% to about 46% by weight;
lanthana in the range of about 4% to about 12% by weight;
praseodymia in the range of about 2% to about 6% by weight;
yttria in the range of about 1% to about 8% by weight; and
a transition metal oxide of ferric oxide in the range of about 0.1% to about 5% by weight.

21. The oxygen storage material of claim 20, wherein the transition metal oxide is surface dispersed on the support.

22. The oxygen storage material of claim 20, wherein the ceria has a reduction temperature at which ceria switches between oxidation states, and the transition metal oxide is present in amount sufficient to decrease the ceria reduction temperature by at least about 100° C. compared to a reference material that does not include an added transition metal.

23. The oxygen storage material of claim 20, wherein the oxygen storage material exhibits a ceria reduction temperature peak less than about 475° C. when the material has been aged in air at about 1000° C. for about 4 hours and tested by hydrogen Temperature Programmed Reduction (TPR) analysis in about 0.5% $H_2$/He.

24. A catalyst for treating engine exhaust comprising the oxygen storage material of claim 20 and a platinum group metal component selected from the group consisting of palladium, rhodium, platinum and combinations thereof.

25. A layered catalyst comprising:
a substrate;
a first washcoat layer comprising the oxygen storage material of claim 20, comprising the support having a transition metal oxide surface dispersed thereon, wherein said transition metal oxide is ferric oxide; and
a second washcoat layer comprising a platinum group metal component on a second support.

26. The layered catalyst of claim 25, wherein the first layer is on the substrate and the second layer is on the first layer.

* * * * *